United States Patent
Fukui

(10) Patent No.: US 8,130,601 B2
(45) Date of Patent: Mar. 6, 2012

(54) OPTICAL DISK DEVICE

(75) Inventor: Toshiaki Fukui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 76 days.

(21) Appl. No.: 12/612,877

(22) Filed: Nov. 5, 2009

(65) Prior Publication Data

US 2010/0118667 A1 May 13, 2010

(30) Foreign Application Priority Data

Nov. 11, 2008 (JP) ................................. 2008-288702

(51) Int. Cl.
G11B 7/00 (2006.01)

(52) U.S. Cl. ............. 369/44.11; 369/112.23; 369/44.29; 369/44.35; 369/53.28; 369/94

(58) Field of Classification Search ............... 369/44.11, 369/44.29, 44.35, 53.28, 94, 112.23
See application file for complete search history.

(56) References Cited

U.S. PATENT DOCUMENTS

| | | | | |
|---|---|---|---|---|
| 7,145,842 B2 * | 12/2006 | Kobayashi | ................ | 369/44.11 |
| 7,800,987 B2 * | 9/2010 | Komma et al. | ............ | 369/44.25 |
| 2001/0030916 A1 * | 10/2001 | Lee | ............................ | 369/44.29 |
| 2007/0177469 A1 * | 8/2007 | Imagawa | .................... | 369/44.23 |
| 2008/0137493 A1 * | 6/2008 | Shinichi | ....................... | 369/44.23 |
| 2011/0158078 A1 * | 6/2011 | Sato | ........................ | 369/112.23 |

FOREIGN PATENT DOCUMENTS

JP 2003-077142 A 3/2003

* cited by examiner

*Primary Examiner* — Wayne Young
*Assistant Examiner* — Brenda Bernardi
(74) *Attorney, Agent, or Firm* — Pillsbury Winthrop Shaw Pittman, LLP

(57) ABSTRACT

This optical disk device includes a pickup, an offsetting means, a focus servo means, a layer jump means, and a shift means. The pickup irradiates laser light upon an optical disk having a plurality of recording layers via a correction lens and an objective lens, and detects light reflected back from the optical disk. The offsetting means generates a focus error (FE) signal on the basis of the reflected light, and applies an offset voltage to the focus error signal. The focus servo means performs focusing servo on the basis of the FE signal. And, before layer jumping is executed by the layer jump means, the focus servo means displaces the correction lens to an intermediate position after having adjusted the offset voltage to a balance value. Then the layer jump means performs layer jumping.

4 Claims, 5 Drawing Sheets

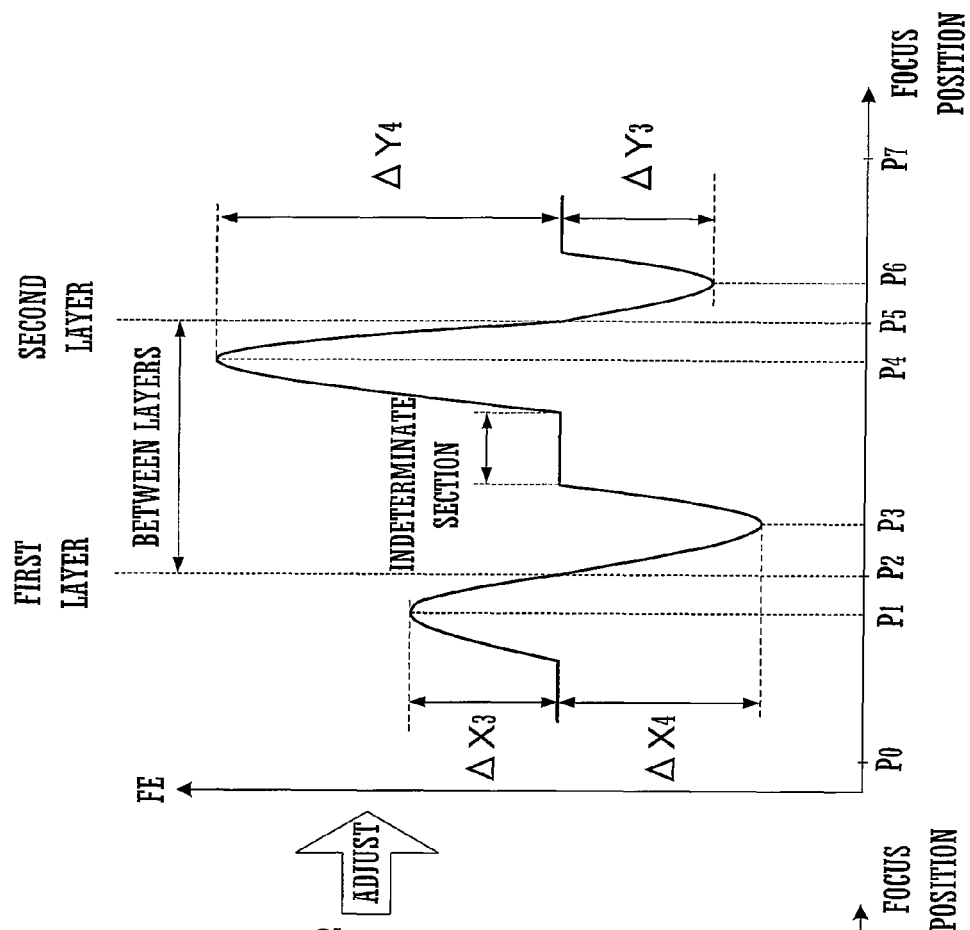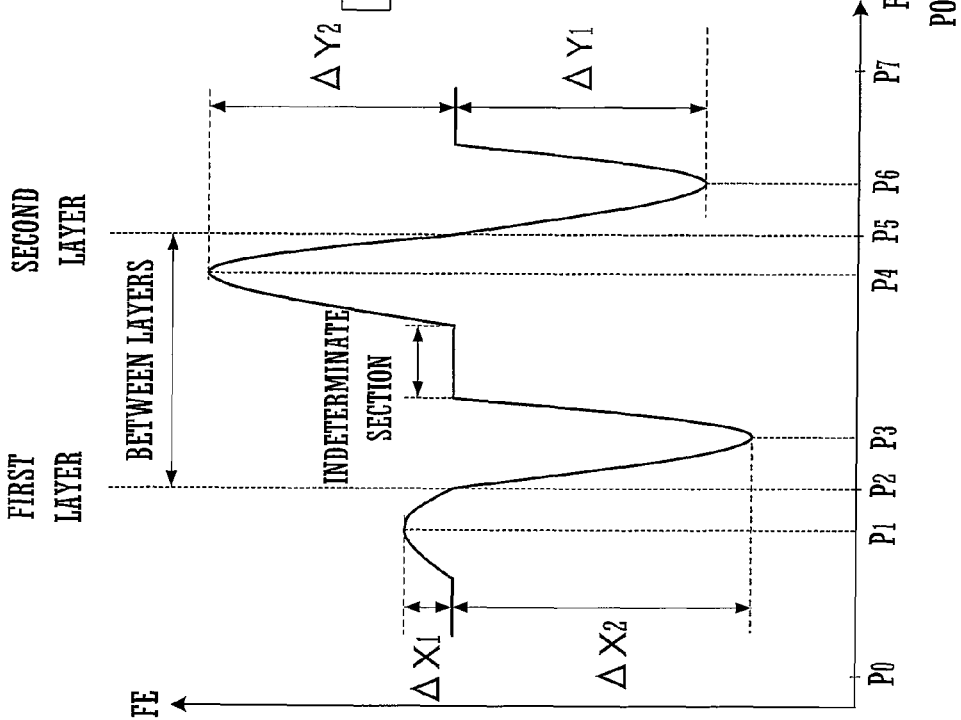

OPTICAL DISK DEVICE

CROSS REFERENCE

This Nonprovisional application claims priority under 35 U.S.C. §119(a) on Patent Application No. 2008-288702 filed in Japan on Nov. 11, 2008, the entire contents of which are hereby incorporated by reference.

BACKGROUND OF THE INVENTION

The present invention relates to an optical disk device which performs recording, deletion and reading upon an optical disk which has a plurality of recording layers, and in particular relates to an optical disk device which performs layer jumping.

From the prior art, optical disk devices which perform recording, deletion, and replay of information to and from optical disks having several recording layers are per se known and have been generally widespread. Such optical disks, for example, may be single sided two layer type Blu-ray disks or two layer type DVDs.

With such a two layer type optical disk, recording, deletion, and replay of information can be performed to and from a first recording layer or a second recording layer. And a cover layer is formed upon such an optical disk, so as to cover over the information recording surfaces on both recording layers. Such a cover layer is a transparent layer of a predetermined thickness, and protects the information recording surfaces of the recording layers. With such an optical disk device, laser light of reading power, recording power, or deletion power is irradiated upon the information recording surfaces of the recording layers via this cover layer. By doing this, reading, recording, or deletion of image data and audio data to and from such an optical disk may be performed with such an optical disk device.

Furthermore, with such an optical disk device, during this reading or recording or deletion, an objective lens included in the pickup is shifted in the direction towards and away from the information recording surfaces of the optical disk, on the basis of a focus error signal which is generated from the laser light reflected from the disk, and focusing servo is performed in order to focus the laser light upon the information recording surface of any desired layer of the optical disk. Moreover, such an optical disk device sometimes performs so-called layer jumping, in which the pickup transitions from a state in which it is performing reading, recording, or deletion upon a first recording layer, to a state in which it performs reading, recording, or deletion upon a second recording layer. Conversely, the optical disk device also sometimes performs layer jumping in the reverse direction as well, in which the pickup transitions from the second recording layer to the first recording layer.

Now, during this layer jumping, due to the shifting from the first recording layer to the second recording layer or the shifting from the second recording layer to the first recording layer, the thickness of the above described cover layer varies. Because of this, the value of spherical aberration also varies. Spherical aberration is a phenomenon in which the focal point of the laser light is not imaged at a single point upon the optical axis, but is imaged while deviating in the depth direction. Because of this the problem arises that, since the focus upon the information recording surface spreads out into a disk, accordingly the sensitivity for reading information or the accuracy for recording or deleting information is deteriorated, which is most undesirable.

Thus, with such an optical disk device according to the prior art, a correction lens for correcting spherical aberration is provided in the optical path of the laser light. And, during layer jumping, this optical disk device sets the correction lens to an intermediate position corresponding to an intermediate value between two optimum correction values which are calculated in advance for each of the first recording layer and the second recording layer. When performing layer jumping, for example, from the first recording layer to the second recording layer, the optical disk device turns focusing servo upon the first recording layer to OFF. And, when the layer jumping has been completed, this optical disk device turns the focusing servo upon the second recording layer to ON, and starts recording, reading, or deleting information to or from the second recording layer.

It should be understood that a focusing control device for a pickup is proposed in Japanese Laid-Open Patent Publication 2003-077142.

However, when setting the correction lens to the above described intermediate position, sometimes the balances between the upwards and downwards amplitude of the waveform of the focus error signal for the first recording layer or the second recording layer are extremely lopsided. Since these amplitudes mean the ranges over which focusing servo is possible, at a recording layer for which the balance is lopsided, there is a possibility that the focusing servo may become lost directly before the layer jump, or that it may not be possible to turn the focusing servo to ON directly after the layer jump. If in this way the focusing servo is lost or cannot be turned to ON, then the recording, reading, or deletion of information to or from the optical disk becomes interrupted, which is very undesirable.

Accordingly, with such a prior art type optical disk device, there has been a problem of interruption of recording, deletion, or reading of information directly before layer jumping, or directly after layer jumping.

The present invention has been conceived in order to solve this type of problem with the prior art, and its object is to provide an optical disk device, with which interruption of recording, deletion, or reading of information directly before layer jumping, or directly after layer jumping, is prevented.

SUMMARY OF THE INVENTION

The optical disk device according to the present invention includes a pickup, an offsetting means, a focus servo means, a layer jump means, and a shift means. The pickup irradiates laser light upon an optical disk via a correction lens and an objective lens, and detects light reflected back therefrom. With this structure, the optical disk has a plurality of recording layers. The correction lens is a lens for correcting spherical is aberration.

The offsetting means generates a focus error signal on the basis of the reflected light, and applies an offset voltage to the focus error signal. The focus servo means performs focusing servo on the basis of the focus error signal. And the layer jump means performs layer jumping to shift the objective lens from a first position in which said focusing servo is performed against a first recording layer to a second position in which said focusing servo is performed against a second recording layer.

Before executing the layer jumping, the focus servo means displaces the correction means to an intermediate position, after having adjusted the offset voltage to a balance value. Then the focus servo means turns the focusing servo to OFF. Here, this balance value is a voltage value at which the balances between the upwards and downwards amplitudes of the focus error signal become the same for the first recording layer and for the second recording layer. And the intermediate position corresponds to a value intermediate between a first correction value of spherical aberration optimum for the first recording layer, calculated in advance, and a second correction value of spherical aberration optimum for the second recording layer, also calculated in advance.

The layer jump means performs the layer jumping when the focusing servo is OFF. Then the focus servo means turns the focusing servo upon the second recording layer to ON when the layer jumping by the layer jump means has terminated.

BRIEF DESCRIPTION OF THE DRAWINGS

FIG. 4A is a figure showing the waveform of a focus error signal obtained in a state in which a correction lens is displaced to an intermediate position, before balance adjustment;

FIG. 4B is a figure showing the waveform of a focus error signal obtained in this state in which the correction lens is displaced to an intermediate position, after balance adjustment.

DETAILED DESCRIPTION OF THE INVENTION

In the following, an optical disk device which is an embodiment of the present invention will be explained.

Figure 1:
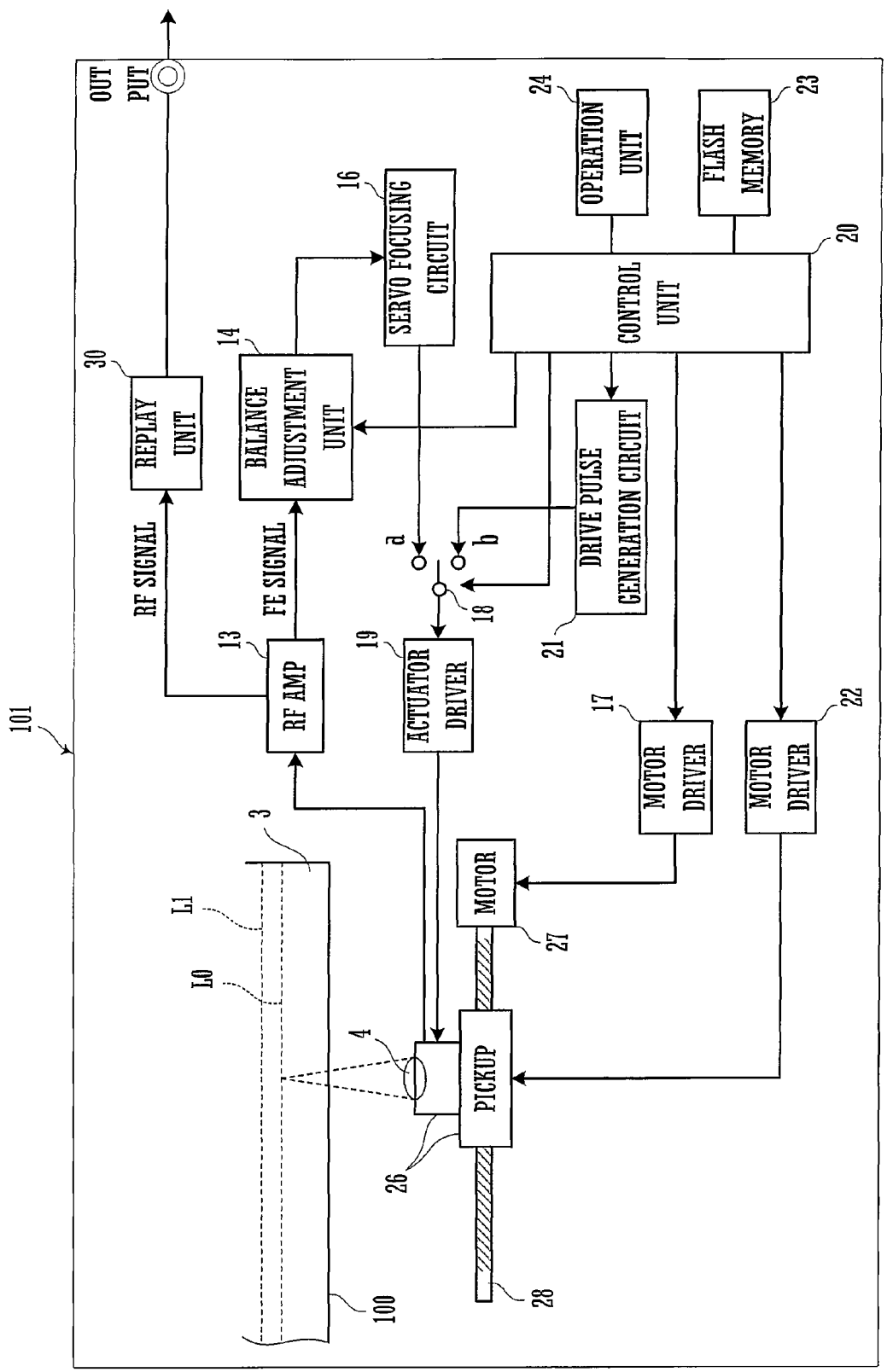
FIG. 1 is a block diagram showing the structure of the main portion of an optical disk device which is an embodiment of the present invention.
Figure 2:
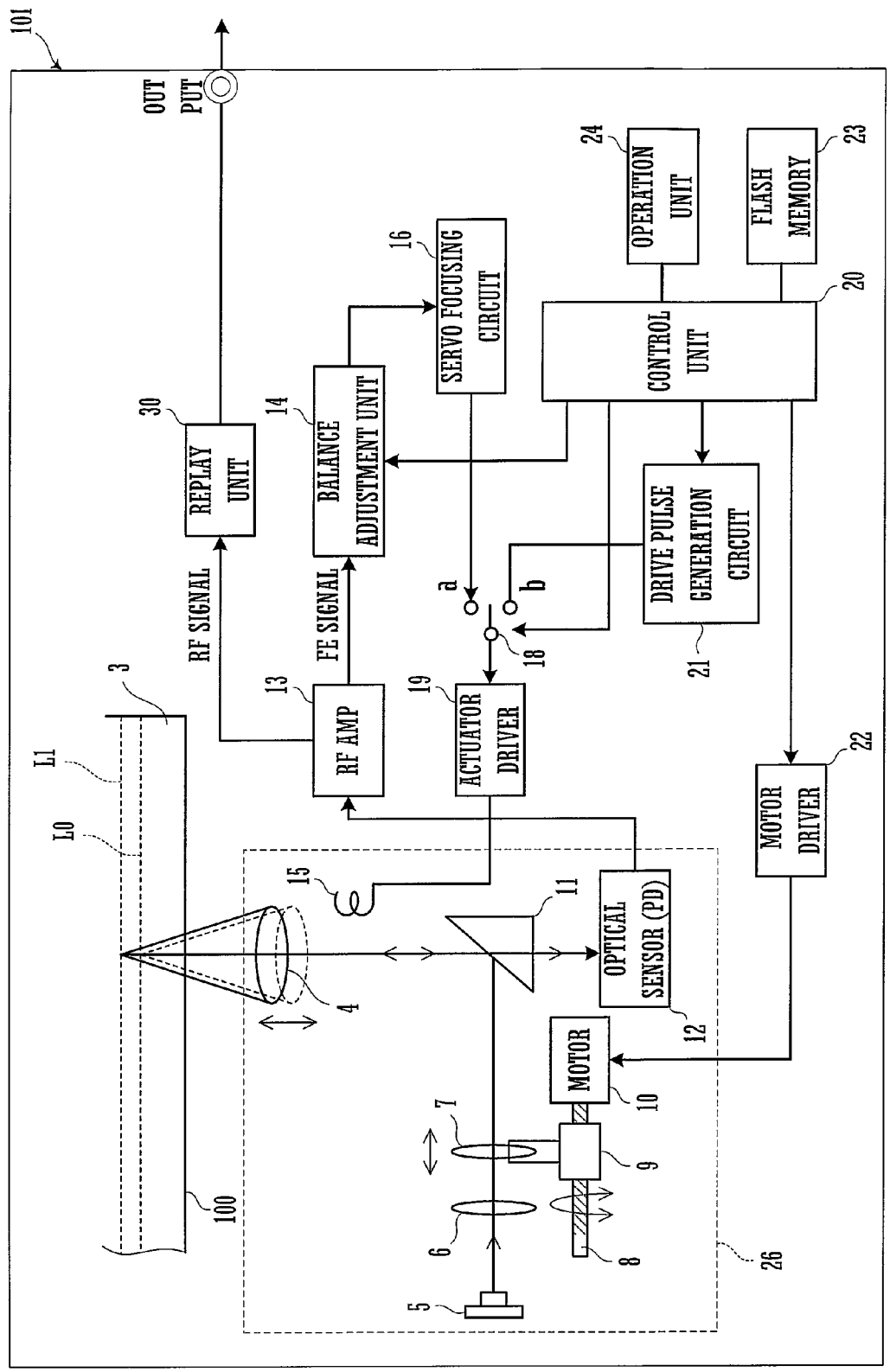
FIG. 2 is a block diagram to which the internal structure of a pickup shown in FIG. 1 is added.

FIG. 1 is a block diagram showing the structure of the main portion of an optical disk device which is an embodiment of the present invention. And FIG. 2 is a block diagram to which the internal structure of a pickup shown in FIG. 1 is added. This optical disk device 101 is a so-called Blu-ray player. As shown in FIG. 1, the optical disk device 101 comprises an RF amp 13, a balance adjustment unit 14, a focusing servo circuit 16, a motor driver 17, a switch 18, an actuator driver 19, a control unit 20, a motor driver 22, a flash memory 23, an operation unit 24, a pickup 26, a stepping motor 27, a lead screw 28, and a replay unit 30.

The pickup 26 comprises an objective lens 4, a laser diode 5, correction lenses 6 and 7, a lead screw 8, a support member 9, a stepping motor 10, a beam splitter 11, a light reception sensor 12, and a focus actuator 15.

The optical disk 100 is a single sided two layer optical disk. This optical disk 100 may be, for example, a DVD (digital versatile disk) or a Blu-ray disk. On this optical disk 100, there are provided a first recording layer L0 upon which information such as image data and audio data and the like is recorded, a second recording layer L1 upon which the same type of information is recorded, and a transparent cover layer 3 which protects these recording layers.

The pickup 26 is provided below the cover layer 3, and is fitted over the lead screw 28. The objective lens 4 is fed in the radial direction of the optical disk 100 by the stepping motor 27 being rotated.

Now the internal structure of this pickup 26 will be explained with reference to FIG. 2. The laser diode 5 is a light source which outputs laser light. And the objective lens 4 is a lens which condenses this laser light. The objective lens 4 regulates the position of irradiation of the laser light upon the optical disk 100. The focus actuator 15 shifts the objective lens in the direction towards and away from the optical disk 100. And the light reception sensor 12 consists of four separated photo-diodes A, B, C, and D, and photo-diodes E and F which are arranged before and after these, or left and right thereof.

The laser light emitted from the laser diode 5 passes through the correction lenses 6 and 7 and is reflected by the beam splitter 11. The reflected laser light passes through the objective lens 4 and is irradiated upon the first recording layer L0 or upon the second recording layer L1. The light reflected back from these recording layers passes through the objective lens 4 and the beam splitter 11, and is received by the light reception sensor 12. The light reception sensor 12 supplies to the RF amp 13 the detection signals A, B, C, and D detected by the photo-diodes A, B, C, and D respectively, and the detection signals E and F detected by the photo-diodes E and F respectively.

The correction lenses 6 and 7 are lenses for correcting spherical aberration. These correction lenses 6 and 7 together constitute an expander. The correction lens 6 is fixed. However, the correction lens 7 is supported by a support member 9 that is fitted over the lead screw 8. Due to this, the correction lens 7 is shifted along the direction of the optical axis by rotation of the stepping motor 10, so that spherical aberration at the focal point of the laser light may be corrected.

Using the detection signals supplied from the light reception sensor 12, the RF amp 13 performs calculation of the value (A+B+C+D). And the RF amp 13 generates an RF signal which is the result of this calculation. Moreover, the RF amp 13 applies an offset voltage and performs amplification of this RF signal. And the RF amp 13 performs waveform shaping upon this RF signal using a waveform shaping circuit not shown in the figures. By doing this, the RF amp 13 converts the RF signal to a two-valued RF signal. And the RF amp 13 supplies this converted two-valued RF signal to the replay unit 30.

Moreover, using the detection signals E and F supplied from the light reception sensor 12, the RF amp 13 performs calculation of the value (E−F). And the RF amp generates a tracking error signal (hereinafter termed the "TE signal") which is the result of this calculation. Furthermore, the RF amp 13 applies an offset voltage to this TE signal and amplifies it. And the RF amp 13 supplies the TE signal to a tracking servo circuit (not shown in the figures).

Furthermore, using the detection signals A, B, C, and D supplied from the light reception sensor 12, the RF amp 13 performs calculation of the value (A+C)−(B+D). And the RF amp 13 generates a focus error signal (hereinafter termed the "FE signal") which is the result of this calculation, and outputs it to the balance adjustment unit 14.

The balance adjustment unit 14 applies an offset voltage which specifies an adjusted voltage value to this FE signal and amplifies it. Then the balance adjustment unit 14 supplies the FE signal to the focusing servo circuit 16. This offset voltage may be a displacement towards the plus side, or may be a displacement towards the minus side. By applying this offset voltage, the balance adjustment unit 14 cancels defocusing originating in offset of the pickup and its peripheral circuitry. The value of this offset voltage may be, for example, 10 mV. The value of this offset voltage receives an FBAL (focus balance) adjustment, so as to correspond to an adjustment value FBAL. This adjusted value FBAL is stored in the flash memory 23. The control unit 20 sets a value of offset voltage corresponding to this FBAL adjustment value to the balance adjustment unit 14. On the basis of the FE signal inputted from the balance adjustment unit 14, the focusing servo circuit 16 generates a focusing servo signal to bring the value of the FE signal to 0 (a reference level). And the focusing servo circuit 16 outputs this focusing servo signal to the actuator driver 19 via the contact point a of the switch 18.

The actuator driver 19 supplies a drive voltage amplified from the inputted signal to the focus actuator 15. Due to this, the actuator driver 19 shifts the objective lens 4 along the direction of the optical axis with respect to the optical disk 100, and thus performs focusing servo control to focus the laser light upon the information recording surface of the optical disk 100.

By performing this focusing servo control, the optical disk device 101 is able to set the focal point of the laser light upon the desired track. Moreover, in this optical disk device, spindle servo control to rotate the optical disk 100 at a target rotational speed by a spindle motor, and tracking servo control to shift the laser light to the desired track, are performed. However, structures related to this spindle servo control and tracking servo control are omitted from FIGS. 1 and 2.

Next, the replay unit 30 performs demodulation processing upon the two-valued RF signal supplied from the RF amp 13. By doing this, the replay unit 30 creates audio data and video data. Then the replay unit 30 decodes this audio and video data which has been generated (for example by MPEG). And the replay unit 30 performs D/A conversion upon this audio and video data. The replay unit 30 then outputs this signal which has been D/A converted to a television or the like which is connected to this optical disk device 101. And the user views audio and video upon this television, based upon the audio and video data.

The operation unit 24 is provided with a plurality of keys which receive operation input from the user. This plurality of keys includes, for example, a replay key which receives a command for replay of an optical disk which has been loaded, a time search replay key which receives a command for time search replay of this optical disk, and so on. Signals (i.e. commands) corresponding to keys which are actuated are transmitted to the control unit 20. Time search replay is a form of replay starting from partway through, in which a predetermined replay time point from the entire replay time of the data recorded upon the optical disk is inputted. This predetermined replay time point corresponds to a time period elapsed from when replay of the data recorded upon the optical disk starts at its beginning.

The control unit 20 comprises, for example, a microcomputer or the like. This control unit 20 includes a ROM which stores a control program, RAM which serves as a working space for holding data processed by this control program, and registers which keep the state of operation execution and so on, none of which are shown in the figures.

The control unit 20 controls the operation of the various sections of this optical disk device 101. Moreover, the control unit 20 monitors the FE signal of the balance adjustment unit 14. Furthermore, the control unit 20 also performs changing over of the contact points of the switch 18. When focusing servo operation is OFF, the control unit 20 changes over the switch 18 to its contact point b. On the other hand, when focusing servo operation is ON, the control unit 20 changes over the switch 18 to its contact point a.

On the basis of a command from the control unit 20, the drive pulse generation circuit 21 generates a drive pulse for layer jumping or the like. And the drive pulse generation circuit 21 outputs this drive pulse to the actuator driver 19 via the contact point b of the switch 18.

It should be understood that the RF amp 13, the focusing servo circuit 16, the control unit 20, the drive pulse generation circuit 21, and the actuator driver 19 correspond to the "focus servo means" of the claims. Moreover, the control unit 20, the drive pulse generation circuit 21, and the actuator driver 19 correspond to the "layer jump means" of the claims. Furthermore, the control unit 20 and the balance adjustment unit 14 correspond to the "offsetting means" of the claims. And the lead screw 8, the support member 9, and the stepping motor 10 correspond to the "shift means" of the claims.

In this embodiment, the operation may be divided into a first stage before replay of information upon the recording layers is performed, and a second stage in which replay of this information upon the recording layers is performed. Here, since recording, reading, and deletion constitute similar operations, replay will be explained as a representative of recording, reading, and deletion. First, the first stage of operation will be explained.

Figure 3:
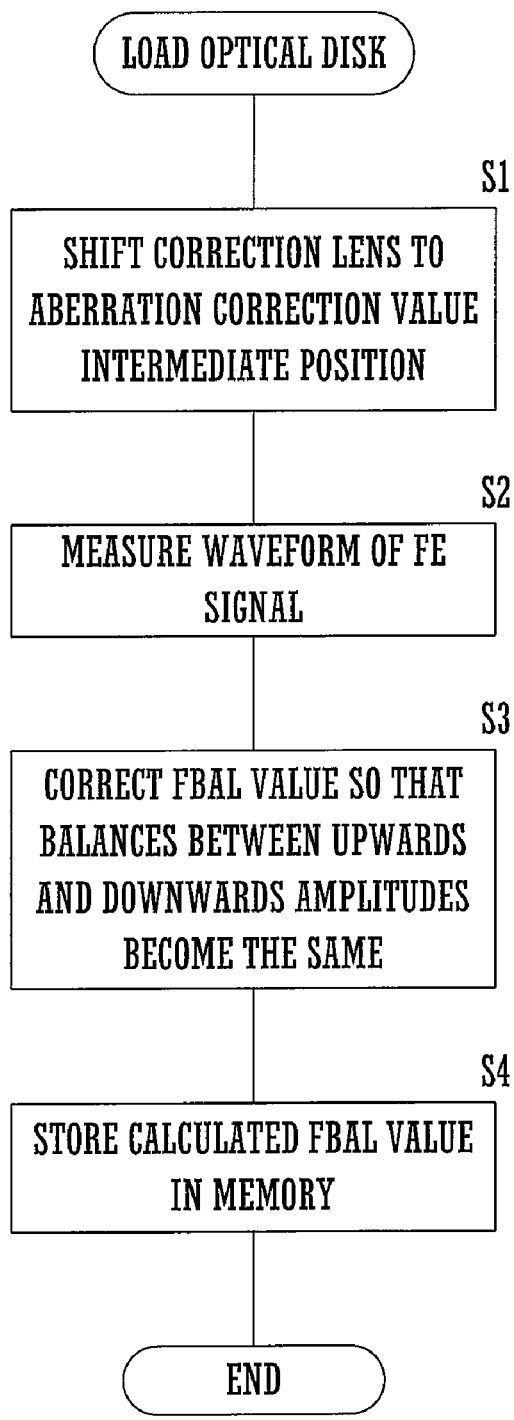
FIG. 3 is a flow chart showing initial operation performed by a control unit of this optical disk device which is an embodiment of the present invention, when an optical disk is loaded.

FIG. 3 is a flow chart showing initial operation performed by the control unit 20 of this optical disk device which is an embodiment of the present invention, when an optical disk is loaded. This operation is performed when the user loads an optical disk 100 into the optical disk device 101.

First, the control unit 20 commands the motor driver 22 to shift the correction lens 7 to an intermediate position (a step S1). This intermediate position is a position which correspond to a value intermediate between a first correction value calculated in advance for spherical aberration which is optimum for the first layer L0, and a second correction value calculated in advance for spherical aberration which is optimum for the second layer L1. And, by performing correction with this intermediate value, the correction lens 7 is shifted to a position which is intermediate between a first position at which the spherical aberration becomes optimum for the first layer L0, and a second position at which the spherical aberration becomes optimum for the second layer L1.

It should be understood that this first correction value and second correction value are current values or voltage values or the like. This intermediate value is also calculated in advance and stored in the flash memory 23. For example, the value intermediate is calculated by "the value intermediate= (the first correction value+the second correction value)/2".

And the control unit measures the FE signal inputted to the balance adjustment unit 14 (a step S2). In this step S2, the control unit 20 commands the drive pulse generation circuit 21 to generate a drive pulse so as to shift the objective lens 4 in the direction towards or away from the information recording surface of the optical disk, so that the lens 4 moves towards that surface or away from it. This drive pulse is transmitted to the actuator driver 19 via the contact point b of the switch 18. Due to this, an FE signal having the waveform shown in FIG. 4A is generated, and is inputted to the balance adjustment unit 14. The control unit 20 measures this FE signal.

FIG. 4A is a figure showing the waveform of the focus error signal obtained in the state in which the correction lens 7 is displaced to its intermediate position, before balance adjustment. And FIG. 4B is a figure showing the waveform of the focus error signal obtained in the state in which the correction lens 7 is displaced to an intermediate position, after balance adjustment. Corresponding to the change of the relative distance between the objective lens 4 and the optical disk 100 which accompanies the shifting of the objective lens 4, the voltage value of the FE signal describes two letter-S shaped curves, one for each recording layer. Moreover, an indeterminate section in which no FE signal is outputted is present between the position $P_2$ at which the focus is upon the first layer L0 and the position $P_5$ at which the focus is upon the second layer L1. In FIG. 4A, the balance between the upward and downward amplitudes of the FE signal is extremely lopsided at the first layer L0. At the first layer L0, $\Delta X_1$ which is the upwards amplitude means the range of capability of the focusing servo (to put it in another manner, the range over which the focus can be pulled). In other words, at the first layer L0, the range of capability $\Delta X$ ($\Delta X=\Delta X_1+\Delta X_2$) of the focusing servo is narrow. Due to this there is a danger that the focusing servo may be lost directly before layer jumping, or that it will not be possible to turn the focusing servo ON directly after layer jumping. If, in this manner, the focusing servo deviates or the focusing servo cannot be turned ON, then the replay of information from the optical disk 100 is interrupted, which is undesirable.

It should be understood that, when the objective lens 4 is positioned at its end point $P_0$, then the objective lens 4 and the information recording surface of the optical disk 100 are to separated to their greatest extent. Conversely, when the objective lens 4 reaches its end point $P_7$, then the objective lens 4 and the information recording surface of the optical disk 100 are in collision.

From the result of this measurement in the step S2, the control unit 20 calculates a balance value of FBAL, at which the balances between the upward and downward amplitudes of the FE signal becomes the same at the first layer L0 and at the second layer L1 (a step S3). The details of the method by which this balance value is calculated will now be explained. First to explain a first method of calculation, the control unit 20 calculates the balance value on the basis of the smaller one $\Delta X_1$ (mV) of the upward and downward amplitudes of the FE signal at the first layer L0, and on the basis of the larger one $\Delta Y_1$ (mV) of the upward and downward amplitudes of the FE signal at the second layer L1. For example, the control unit 20 calculates the balance value (for example −20 mV) according to the equation "$(\Delta X_1-\Delta Y_1)/2$=balance value (mV)". Next, in a second calculation method, the control unit 20 finds the FE signal at the first layer L0, and calculates "(upward amplitude $\Delta X_1$ at the point $P_1$)/downward amplitude $\Delta X_2$ at the point $P_3$)=balance at the first layer L0 (%)". Moreover, the control unit 20 finds the FE signal at the second layer L1, and calculates "(upward amplitude $\Delta Y_2$ at the point $P_4$)/downward amplitude $\Delta Y_1$ at the point $P_6$)=balance at the second layer L1 (%)". Finally, the control unit 20 calculates the balance value according to the equation "(balance at the first layer L0)−(balance at the second layer L1)=balance value (%)".

Figure 5:
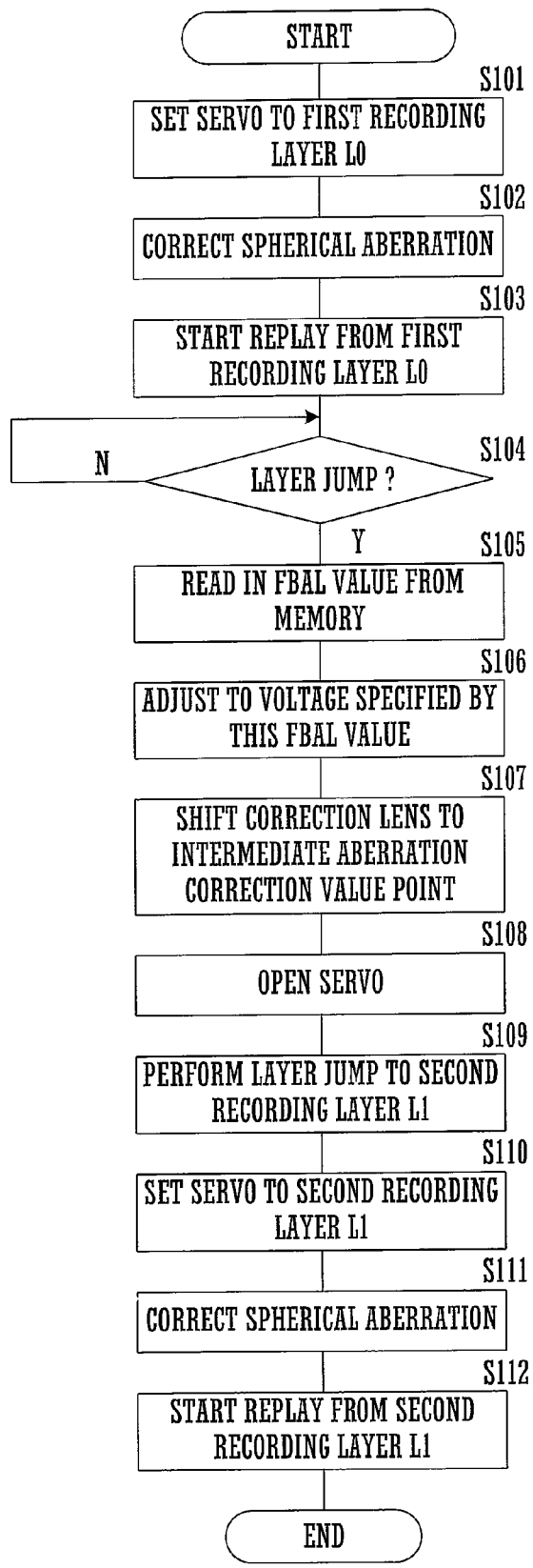
FIG. 5 is a flow chart showing operation performed during replay by the control unit of this optical disk device which is an embodiment of the present invention.

It should be understood that, when the voltage value of the offset voltage is adjusted in the step S106 of FIG. 5 to its balanced value, the FE signal to which this offset voltage is applied has the waveform shown in FIG. 4B.

Finally, the control unit stores the FBAL value which has been calculated in the flash memory 23 (a step S4). And the control unit transits to its input awaiting state, in which it waits for operation input from the user.

Next, the second stage of operation will be explained.

FIG. 5 is a flow chart showing operation performed during replay by the control unit of this optical disk device 101 which is an embodiment of the present invention. This operation is performed when, in the state with an optical disk 100 loaded into this optical disk device 101, the user depresses the replay key.

It should be understood that, at the stage at which a layer jump from the first layer L0 to the second layer L1 is performed, the first layer L0 corresponds to the "first recording layer" of the claims. Moreover, the second layer L1 corresponds to the "second recording layer" of the claims. First, the control unit 20 performs focus pulling to the first layer L0, and turns focusing servo ON (a step S101). Due to this, focusing servo is performed via the contact point a of the switch 18.

The control unit 20 commands the motor driver 22 to change the position of the correction lens 7, and thus corrects spherical aberration at the first layer L0 (a step S102).

Then the control unit 20 starts to replay the image and audio data recorded upon the first layer L0 (a step S103).

And the control unit 20 decides whether or not to perform a layer jump from the first layer L0 to the second layer L1 (a step S104). This decision, for example, may be affirmative when during replay of the first layer L0 of the optical disk 100, using the time search key, the user has issued a command via the operation unit 24 for replay of image or audio data recorded upon the second layer; or it may be affirmative when replay of the first layer L0 ends so that replay of the second layer L1 starts. In FIG. 5, shifting the focus position from the recording surface of the first layer of the optical disk 100 to the recording surface of its second layer is taken as representative, so that the process of shifting from the recording surface on the first layer L0 to the recording surface upon the second layer L1 will be explained.

When this layer jump is to be performed, the control unit 20 reads in the FBAL value stored in the step S4 from the flash memory 23 (a step S105).

Then the control unit 20 adjusts the value of the offset voltage applied by the balance adjustment unit 14 to the FBAL value which has been read in (a step S106).

And then the control unit 20 commands the motor driver 22 to shift the correction lens 7 to an intermediate position (a step S107). Due to this the FE signal, to which the offset voltage has been applied by the balance adjustment unit 14, assumes the waveform shown in FIG. 4B. In FIG. 4B, the balance between the upwards and downwards amplitudes of the waveform of the FE signal is the same for the first layer L0 and for the second layer L1. And the range $\Delta X$ ($\Delta X=\Delta X_3+\Delta X_4$) at the first layer L0 over which focusing servo can be performed is widened. Due to this, at the step S107 directly before layer jumping, it is possible to prevent undesirable loss of focusing servo. Accordingly, it is possible to prevent interruption of replay of information from the optical disk taking place directly before layer jumping.

Then the control unit changes over the switch 18 to its contact point b, and turns focusing servo to the first layer L0 to OFF (a step S108).

And the control unit 20 generates a jump pulse from the drive pulse generation circuit 21, and thus performs layer jumping from the first layer L0 to the second layer L1 (a step S109). This jump pulse is input to the actuator driver 19 via the contact point b of the switch 18. When from the first layer L0 the intermediate section is passed over and an RF signal is obtained which exceeds a predetermined threshold value, then in the section $P_4 \sim P_6$ an FOK signal is obtained which gives the range over which focus pulling is possible.

When at the point $P_5$ the FE signal crosses the zero focus lever, the control unit 20 takes this point $P_5$ as a criterion, and turns ON the focusing servo for the second layer L1 (a step S110). Due to this, focusing servo is performed via the contact point a of the switch 18.

And the control unit 20 commands the motor driver 22 to change the position of the correction lens 7, and thus corrects spherical aberration at the second layer L1 (a step S111).

Then the control unit 20 starts to replay image and audio data recorded upon the second layer L1 (a step S112).

Subsequently, in a similar manner to the step S104, the control unit 20 makes a decision as to whether or not to perform layer jumping from the second layer L1 to the first layer L0. And, if layer jumping is to be performed, then the control unit 20 executes the same operations as those from the step S105 to the step S108, so as to perform layer jumping from the second layer L1 to the first layer L0. Then the control unit 20 turns focusing servo for the first layer L0 to ON. In a similar manner to that described above, in FIG. 4B, the balances between the upwards and downwards amplitudes of the waveform of the FE signal become the same for the first layer L0 and for the second layer L1. In other words, the range over which focusing servo for the first layer L0 is possible ($\Delta X = \Delta X_3 + \Delta X_4$) becomes widened. Due to this, it is possible to prevent it becoming impossible to turn the focusing servo to ON directly after a layer jump from the second layer L1 to the first layer L0. Accordingly, it is possible to prevent interruption of replay of information from the optical disk 100 directly after layer jumping.

Due to the above, it is possible to prevent interruption of replay of information from the optical disk 100 directly before layer jumping, and also directly after layer jumping.

It should be understood that, at the stage that layer jumping is being performed from the second layer L1 to the first layer L0, the first layer L0 corresponds to the "second recording layer" of the claims. Moreover, the second layer L1 corresponds to the "first recording layer" of the claims.

It should be understood that the operation unit 24 may be provided with a changeover key for changing over whether adjustment of the offset voltage to the balance value is prohibited or is permitted. By doing this, with this changeover key, the user is able to change over whether or not the offset voltage is to be adjusted to the balance value, according to his own method of use. Accordingly, it is possible to enhance the convenience of use for the user.

Finally, all of the features described in the explanation of this embodiment given above are only cited by way of example, and must not be viewed as being limitative of the present invention in any way. The scope of the present invention is not defined by the embodiment described above, but only by the range of the claims. Moreover, all changes which are equivalent in meaning and scope to the scope of the claims, are intended to be included within the range of the present invention.

What is claimed is:

1. An optical disk device, comprising:
   a pickup which irradiates laser light upon an optical disk having a plurality of recording layers via a correction lens for correction of spherical aberration and an objective lens, and which detects light reflected back from the optical disk;
   offsetting means which generates a focus error signal on the basis of the reflected light, and which applies an offset voltage to the focus error signal;
   focus servo means which performs focusing servo to shift the objective lens in the direction to approach the objective lens towards the optical disk or to withdraw objective lens from the optical disk, on the basis of the focus error signal outputted from the offsetting means;
   layer jump means which performs layer jumping to move the objective lens from a first position in which the focusing servo is performed against a first recording layer among the plurality of recording layers, to a second position in which the focusing servo is performed against a second recording layer among the plurality of recording layers; and
   shift means which shifts the correction lens to an intermediate position corresponding to a value intermediate between a first correction value of spherical aberration optimum for the first recording layer, calculated in advance, and a second correction value of spherical aberration optimum for the second recording layer, calculated in advance;
   wherein:
   before recording of information upon the recording layers, deletion of information therefrom, or reading of information therefrom, the offsetting means measures the focus error signal which has a letter-S shaped waveform for each recording layer, by shifting the objective lens in the approach and withdrawal direction in the state in which the shift means has shifted the correction lens to the intermediate position, and, from the result of this measurement, calculates a balance value which is the voltage value of the offset voltage at which the balances between the upwards and downwards amplitudes of the focus error signal become the same for the first recording layer and for the second recording layer;
   when recording information upon the recording layers, deleting information therefrom, or reading information therefrom, before executing the layer jumping, the focus servo means displaces the correction means with the shift means to the intermediate position, after having adjusted the offset voltage to the balance value calculated by the offsetting means and turns the focusing servo upon the first recording layer to OFF;
   the layer jump means performs the layer jumping when the focusing servo is OFF; and
   the focus servo means turns the focusing servo upon the second recording layer to ON when the layer jumping by the layer jump means terminates.

2. The optical disk device according to claim 1, wherein the optical disk is a two layer type optical disk.

3. The optical disk device according to claim 1, wherein the offsetting means calculates the balance value on the basis of the smaller one of the upwards and downwards amplitudes of the focus error signal for the first recording layer, and the larger one of the upwards and downwards amplitudes of the focus error signal for the second recording layer.

4. The optical disk device according to claim 1, further comprising an operation means which receives change over operation to forbid, or to permit, the focus servo means to adjust the offset voltage to the balance value.

* * * * *